March 4, 1969
E. UHLMANN
3,431,482
POWER TRANSMISSION FOR HIGH VOLTAGE DIRECT CURRENT
Filed Jan. 20, 1967
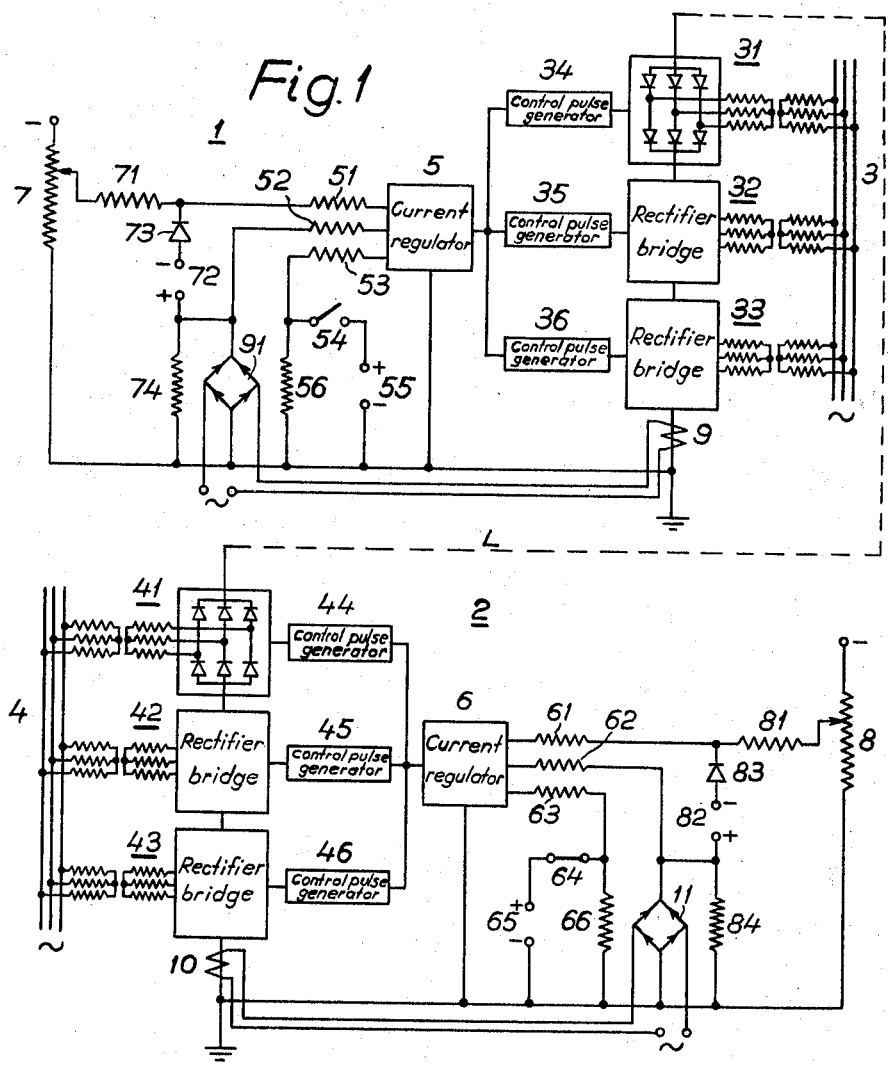
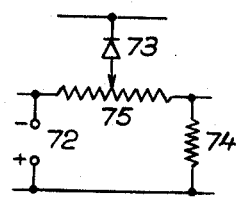
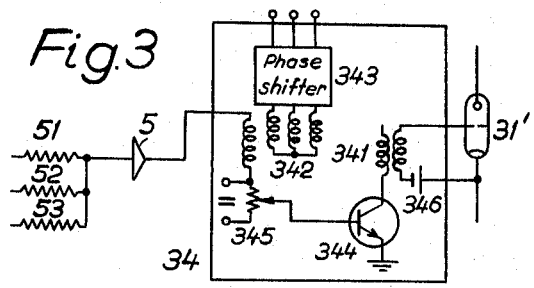
INVENTOR.
ERICH UHLMANN
BY
Bailey, Stephens + Huettig
ATTORNEYS

United States Patent Office 3,431,482
Patented Mar. 4, 1969

3,431,482
POWER TRANSMISSION FOR HIGH VOLTAGE DIRECT CURRENT
Erich Uhlmann, Ludvika, Sweden, assignor to Allmänna Svenska Elektriska Aktiebolaget, Vasteras, Sweden, a Swedish corporation
Filed Jan. 20, 1967, Ser. No. 610,569
Claims priority, application Sweden, Jan. 21, 1966, 765/66
U.S. Cl. 321—2                    1 Claim
Int. Cl. H02m 3/32

ABSTRACT OF THE DISCLOSURE

An HVDC-transmission system includes a rectifier station and an inverter station connected together with a DC transmission line. Each station is provided with a current regulator provided with a setting circuit for presetting a desired current value of the proper station and the current setting of the rectifier station exceeds that of the inverter station by a certain value, the so-called current margin. Furthermore, each current regulator is provided with a maximum current limiting circuit composed of a fixed voltage source and a variable voltage source counteracting each other. The fixed voltage source exceeds a value corresponding to a desired maximum transmission current, while the variable voltage source is proportional to the real transmission current.

---

The present invention relates to a power transmission for high voltage direct current comprising a rectifier station and an inverter station interconnected with a DC line.

Usually such a transmission is controlled according to the current margin principle, which means that both the rectifier station and the inverter station are provided with a current regulator to set a certain current value in each station, which current value is chosen so that the current adjustment of the rectifier station exceeds the current adjustment of the inverter station by a certain quantity, the so-called current margin. This current margin is usually reached by setting the same current in both stations and simultaneously subtracting a magnitude corresponding the desired current margin from the current adjustment in the inverter station. In this way one station, usually the inverter station, will determine the direct voltage of the transmission while the other station determines the magnitude of the direct current transmitted.

The current adjustment in the current regulators of the stations is done from outside and may, for example, be derived from a certain desired transmitted power of from a certain desirerd frequency in the AC network connected to the inverter station. To ensure that the current value set does not exceed the permitted current for the transmission, the current regulators should be provided with a current limiting device, consisting of, for example, a permanent voltage source which, through a diode having opposite conducting direction to the polarity of the voltage source, is connected to the input side of the current regulator. If the signal for the current to the current regulator exceeds the value of said permanent voltage source, the signal will be shunted by said diode so that the current signal to the current regulator can never exceed the value indicated by the permanent voltage source.

The combination of the current margin principle and current limiting principle gives reliable and steady control of the transmission. However, it has the disadvantage that when the current control is switched over to the inverter station which occurs, for example, when the direct voltage of the rectifier station decreases due to disconnection of a converter in the rectifier station, the current will be limited both by the current limiting device and by the current margin, which is particularly inconvenient since with limited transmission voltage it is often desirable to take out maximum current in order to reduce the power as little as possible.

The mentioned disadvantage is avoided according to the present invention where the current limiting is made current dependent and the idea of the invention is thus characterised in that the limiting device comprises a permanent direct voltage source which is counterconnected to an adjustable direct voltage source proportional to the direct current of the transmission. In this way the current limiting will not become effective in either the rectifier station or the inverter station before the maximum permitted current value has been fully reached in the transmission.

The invention will be more fully described with reference to the accompanying drawing where FIGURE 1 shows a power transmission with a current limiting device according to the invention, while FIGURE 2 shows a modification of the current limiting device according to FIGURE 1. FIGURE 3 shows in more detail a control circuit according to FIGURE 1.

FIGURE 1 shows a DC power transmission system comprising two converter stations, a rectifier station 1 and an inverter station 2, which are connected to AC networks 3 and 4 respectively and to a DC line L. Each station comprises three converters 31–33 and 41–43, respectively, and each converter is provided with a control angle device 34–36 and 44–46, respectively, arranged to deliver control impulses to the rectifiers in each converter. The control angle devices in each station are controlled from a common current regulator 5, 6, respectively and each current regulator is provided with three inputs with corresponding input resistances 51–53 and 61–63, respectively. To the first input resistance 51, 61, respectively, in each current regulator, a signal is connected from a current adjusting device consisting of a potentiometer 7, 8, respectively, connected between earth and a negative voltage. The adjustable output from the potentiometer is connected through a resistance 71, 81 respectively, to the corresponding input of the current regulator 5, 6, respectively. These current adjusting devices are set according to the control program which has been determined for the transmission, and, if a certain transmitted power is desired, it is possible from this power magnitude and the direct voltage of the transmission to determine the desired transmission direct current at any time. Usually it is assumed that the outputs of the potentiometers in both the stations have been set at the same level. In order to obtain a difference between the current adjustments in the two stations, a so-called current margin, a special current margin device is arranged in each station, consisting of a voltage source 55, 65, respectively, connected across a resistance 56, 66, respectively and connected to the input resistance 53, 63, respectively. The current margin device is actuated by means of a contact 54, 64, which is open in the rectifier station but closed in the inverter station. In this way the voltage from the voltage source 65 in the inverter station will be subtracted from the current adjustment obtained from the potentiometer 8. A measuring transductor 9, 10, respectively is connected in the DC line in both stations in order to provide the current regulators with a measurement for the actual direct current. The AC signal obtained from the transductors is rectified in the rectifier bridges 91 and 11 respectively, and the rectified signal is connected to the input resistance 52, 62, respectively of the current regulators.

To ensure that the current order to the current regulators does not exceed the value permitted for the transmission, a current limiting device is connected to the input side of each current regulator. Such a current limiting device may, for example, consist of a direct voltage source 72, 82, respectively which, through a diode 73, 83 and a resistance 74, 84 is connected to the input resistance 51, 61 on the respective current regulator. Disregarding at first the connection between the voltage source 72, 82, and the rectifier bridge 91, 11, respectively, it is seen that if the numerical value of the negative voltage set in the potentiometer 7, 8, respectively, exceeds the value of the corresponding voltage 72, 82 in the current limiting device, the diode 73, 83, respectively will be conducting so that the voltage from the corresponding potentiometer will be limited to the voltage value 72, 82, respectively.

A transmission according to FIGURE 1 will operate in such a way that the current regulators in both stations try to set the corresponding delay angle control device for the converters in such a way that the direct current measured by the measuring transductors 9, 10, respectively, corresponds to the desired direct current value set in the current regulators. As the current order set in the rectifier station exceeds the resultant current order in the inverter station, which in this station consists of the difference between the current order from the potentiometer 8 and the current margin device 64–66, the rectifier station will increase its direct voltage in order to maintain the greater current while the inverter station in turn will increase its direct voltage to reduce the direct current coming from the rectifier station. The result is a conflict between the two stations and the rectifier station is suitably provided with such voltage potentialities that it prevails, that is increases its voltage so much that the direct current transmitted is equal to the value set in the current regulator of the rectifier station. The rectifier station will thus increase its direct voltage until it is equal to the sum of the maximum possible countervoltage in the inverter station and the ohmic voltage drop in the transmission. In this way it is the countervoltage in the inverter station which determines the direct voltage of the transmission.

In the event of a fault in a converter in the rectifier station, this converter will be bypass connected by means of a bypass connection not shown, and the voltage potentialities of the rectifier station will probably fall below the countervoltage of the inverter station and the transmitted direct current will thus rapidly decrease. Consequently, not even the lower current order set in the inverter current regulator will be maintained and the current regulator 6 thus decreases the countervoltage of the inverter in order to increase the direct current transmitted. In this way the transmission will be kept in operation at least, but now with the transmitted current limited by means of the current margin. The transmitted power will therefore be limited both by the voltage drop caused by the removal of a converter in the rectifier station and by the current limited by the current margin. If the transmission operates with, for example a certain desired transmitted power, this power adjustment will influence the setting of the potentiometer 8, but this adjustment is limited by the current limiting device 82–84. However, not even the maximum permitted current indicated by the current limiting device is reached, but this is further limited as mentioned, by the current margin device 64–66.

In order to avoid this extra and unnecessary current limitation, it is proposed according to the invention to choose the voltage for the current limiting (at 82) somewhat higher than previously, and at the same time subtract from this current limiting voltage the signal from the measuring transductor 10 which corresponds to the actual direct current in the circuit. In FIGURE 1 this can quite simply be done by connecting the upper output terminal from the rectifier bridge 11 to the positive pole of the direct voltage source 82. In this way the current limiting signal will consist of a permanent voltage from the voltage source 82 and a voltage from the bridge 11 dependent on the actual direct current. A similar connection is made in the rectifier station between the bridge 91 and the voltage source 72. In this way it is seen that the current limitation in both stations will be directly dependent on the actual current in the transmission and, as the current set by current regulation from the inverter station is reduced by the current margin adjustment, the resultant current limitation in the inverter station will be relatively high in comparison with the rectifier station. Thus, according to the invention it is achieved that the current limitation caused by the current margin adjustment will be reduced at current regulation from the inverter station.

FIGURE 2 shows a modification of a current limiting device according to FIGURE 1. As in FIGURE 1, the current limiting device comprises a voltage source 72, a diode 73 and a resistance 74, but the voltage source 72 is here parallel-connected with the resistance 74 over a second resistance 75. The resistance 75 is made as a potentiometer and the diode 73 is connected to its movable output. By adjustment of the potentiometer 75 it is possible to alter the current dependency of the current limitation as well as the resultant current value of the current limitation.

In FIGURE 1 the current limiting device is connected to the measuring transductors 9 and 10 which are used to provide the current regulator with the actually transmitted current value. This is not absolutely necessary. The current limiting device may of course instead be provided with a measuring transductor of its own to obtain the desired measured value of the transmission current.

FIGURE 3 shows how the control circuit of one of the rectifiers 31' in the converter 31 is connected to the current regulator 5 through the control pulse generator 34. The rectifier 31' can be a mercury arc rectifier or a thyristor rectifier comprising a number of series-connected thyristors.

The current regulator 5 is formed as an amplifier, the input side of which forms a connection point between the resistors 51, 52 and 53 so that said resistors form a voltage divider. The output side of said amplifier is connected to the input side of the control pulse generator 34.

Said control pulse generator comprises a grid voltage transformer 341 the secondary side of which is connected to the control path of the rectifier 31' over a bias voltage source 346 making the cathode of rectifier 31' positive in relation to the control electrode. The primary side of said grid voltage transformer is connected to a positive voltage source and in series with a transistor 344. The base electrode of said transistor is connected to the amplifier 5 over a bias voltage taken from a potentiometer 345 and a secondary phase winding of a voltage transformer 342. Said voltage transformer is connected to the AC network 3' over a phase shifter 343 so that the generator 34 is provided with an AC reference voltage.

When the sum of the output voltage from the amplifier 5 and the AC reference voltage from transformer 342 and the bias voltage from the potentiometer 345 passes zero and becomes positive the transistor 344 becomes conducting and a current arises in the transformer 341. Then a voltage is induced in the secondary side of this transformer, said voltage exceeding the bias voltage 346 so that the rectifier 31' will have a positive grid voltage and is ignited with a certain delay angle in relation to the zero passage of its commutation voltage. The initial value of said delay angle is preset by means of the phase shifter 343 and the potentiometer 345 and after this presetting the actual delay angle is determined from the output voltage of the amplifier. As said delay angle determines the direct voltage of the proper converter it is seen that said direct voltage is determined from the current regulator or amplifier 5.

I claim:

1. A high voltage direct current power transmission system comprising a rectifier station and an inverter station and a direct current transmission line connecting said two stations; a current regulator in each station; a setting device in each current regulator for presetting a desired direct current value in the proper station; the current setting in said rectifier station exceeding that of said inverter station by a certain amount; each current regulator being provided with a maximum current limiting device; said curernt limiting device comprising a fixed direct voltage source and a variable direct voltage source; said two direct voltage sources counteracting each other; said fixed voltage source exceeding a value corresponding to a desired maximum transmission current; said variable voltage source being proportional to the actual transmission current.

References Cited

UNITED STATES PATENTS

| | | | |
|---|---|---|---|
| 2,208,183 | 7/1940 | Alexanderson | 321—2 |
| 2,832,029 | 4/1958 | Forssell | 321—2 |
| 2,866,148 | 12/1958 | Forssell | 321—2 |
| 3,036,257 | 5/1962 | Ohlmann | 321—2 |
| 3,064,139 | 11/1962 | King | 307—82 X |

LEE T. HIX, *Primary Examiner.*

W. H. BEHA, JR., *Assistant Examiner.*